United States Patent
Steele et al.

[11] Patent Number: 6,019,409
[45] Date of Patent: Feb. 1, 2000

[54] ADJUSTABLE POSITIONING TARGET ASSEMBLY

[75] Inventors: Kenneth Steele; Frank Hagadorn, both of Fort Wayne; William D. Givins, Berne, all of Ind.

[73] Assignee: PHD, Inc., Fort Wayne, Ind.

[21] Appl. No.: 09/158,727

[22] Filed: Sep. 22, 1998

Related U.S. Application Data

[60] Provisional application No. 60/059,599, Sep. 23, 1997.

[51] Int. Cl.[7] .................................................. B25J 19/02
[52] U.S. Cl. .......................... 294/119.1; 294/907; 901/46
[58] Field of Search ............................... 294/119.1, 907, 294/86.4, 67.33, 81.54; 901/46, 47

[56] References Cited

U.S. PATENT DOCUMENTS

| | | |
|---|---|---|
| 4,579,380 | 4/1986 | Zaremsky et al. ...................... 294/907 |
| 4,660,274 | 4/1987 | Goumas et al. ........................ 294/907 |
| 4,768,821 | 9/1988 | Hucul et al. . | |

OTHER PUBLICATIONS

PHD. Inc.'s Sales Brochure comparing Series C Parallel Grippers with a Standard Gripper, consisting of 5 pages, not dated.

*Primary Examiner*—Dean J. Kramer
*Attorney, Agent, or Firm*—Barnes & Thornburg

[57] ABSTRACT

An adjustable positioning target assembly for use in a positioning device includes a target member that is secured in a desired position in an internally threaded bore between a pair of set screws. The internally threaded bore is provided in body of a positioning device. Proximity sensors which respond to the target member are coupled to an element of the positioning device. The body and element of the positioning device are movable with respect to one another. The target member and set screws can include through-holes which allow the target member and set screws to be adjustably positioned in the internally threaded bore by a driver tool. The adjustable positioning target assembly can be used in cooperation with gripper jaws or other positioning devices.

21 Claims, 2 Drawing Sheets

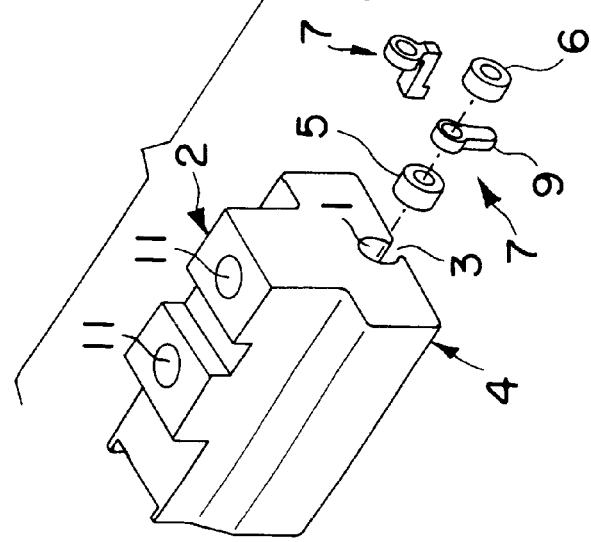
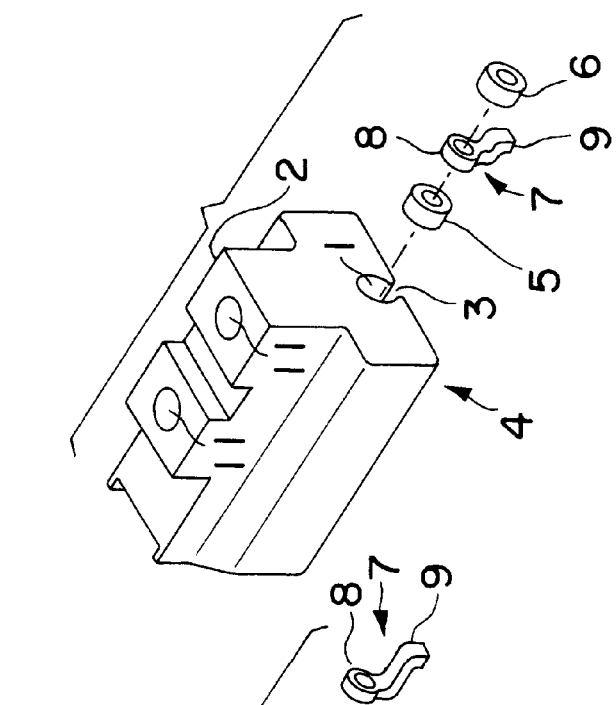
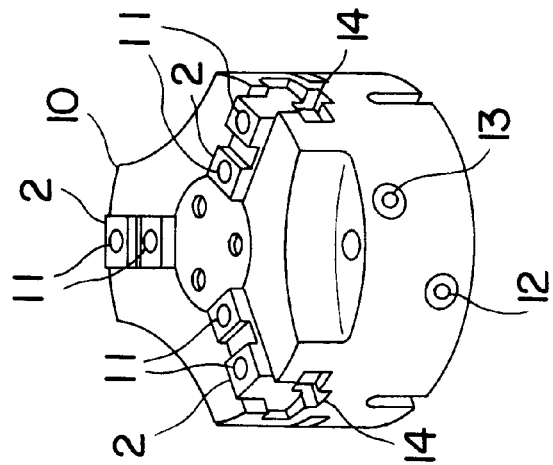

ADJUSTABLE POSITIONING TARGET ASSEMBLY

RELATED APPLICATIONS

The present application is based upon U.S. Provisional Application Ser. No. 60/059,599, filed Sep. 23, 1997, the complete disclosure of which is hereby expressly incorporated by reference.

TECHNICAL FIELD

The present invention relates to workpiece holders having moveable jaw members. More particularly the present invention relates to workpiece and part grippers having moveable jaws and proximity sensors which are used to determine the position of the movable jaw members. The present invention further relates to adjustable positioning target assemblies which can be used in conjunction with a variety of positioning devices.

BACKGROUND ART

There are a variety of jaw designs for workpiece and parts grippers including those with sliding jaw members. Such sliding jaw members are typically positioned in channels that are formed in the base or body of a gripper assembly. The jaws are reciprocally driven back and forth in the channels by fluid actuators or other mechanical means. Such jaw designs are used in gripper assemblies which include two opposable jaws or multiple jaws which are capable of converging on a workpiece or part to be gripped.

An example of a gripping apparatus which includes two slidable opposing jaw members is disclosed in U.S. Pat. No. 4,176,821 and exemplified by the "SHURGRIP" gripper which is available from Phd, Inc., Fort Wayne, Ind. The SHURGRIP gripping apparatus can be provided with optional proximity sensors which sense the position of the gripper jaws. The proximity sensors include switches which are triggered by target structures that are attached to the gripper jaws. The target structures trip switches of the proximity sensors. The tripping of the switches indicates the position of the target structure and hence the position of the jaws Because different workpieces and parts may require that the jaws of a gripper be positioned at different locations for closing and opening, proximity sensors designed for the SHURGRIP gripper and other slidable gripping assemblies are adjustably positionable. That is, the position of the proximity sensors are adjustable along the axis of travel of the targets.

The present invention is directed to adjustable target assemblies which can be incorporated into slidable jaw members and used in devices such as the SHURGRIP and other devices which include at least one or more slidable gripper jaws. The present invention is further directed to adjustable positioning target assemblies which can be used in conjunction with a variety of positioning devices other than mechanical grippers.

DISCLOSURE OF THE INVENTION

According to various features, characteristics and embodiments of the present invention which will become apparent as the description thereof proceeds the present invention provides an adjustable target assembly for use in positioning devices which comprises:

a body having an internally threaded bore therein;

a target member having a circular base portion with a through-hole therein, the circular base portion being positioned within the internally threaded bore; and first and second set screws positioned within the internally threaded bore on opposites sides of the circular base portion of the target member, at least one of the first and second set screws having a through-hole therein.

The present invention further provides a method of adjusting proximity sensors in a positioning device, which proximity sensors include a target member, the method which involves:

providing an internally threaded bore in a portion of the positioning device;

providing a target member having a circular base portion;

providing first and second set screws; inserting the first set screw into the internally threaded bore and adjusting the position of the first set screw within the internally threaded bore;

inserting the circular base portion of the target member in the internally threaded bore; and inserting the second set screw into the internally threaded bore and driving the second set screw against the circular base portion of the target member so that the target member is secured in position between the first and second set screws.

The present invention also provides a gripper device which comprises:

a base;

at least a one gripper jaw which is movable relative to the base;

an internally threaded bore in one of the base or each of the gripper jaws;

a target sensor coupled to the other of the base of the gripper jaw; and an adjustable target assembly provided in the internally threaded bore, the adjustable target assembly comprising:

a target member having a circular base portion, the circular base portion being positioned within the internally threaded bore; and first and second set screws positioned within the internally threaded bore on opposites sides of the circular base portion of the target member.

BRIEF DESCRIPTION OF THE DRAWINGS

FIG. 1 is a perspective view of a gripper jaw member according to one embodiment of the present invention and an adjustable target assembly designed for sensing the open position of the jaw member.

FIG. 2 is a perspective view of a gripper jaw member according to the present invention depicting an adjustable target assembly which is used for sensing the jaw member in its closed position.

FIG. 3 is a perspective view of a gripper jaw assembly which is provided with three gripper jaw members.

BEST MODE FOR CARRYING OUT DESCRIPTION OF THE INVENTION

Figure 6:
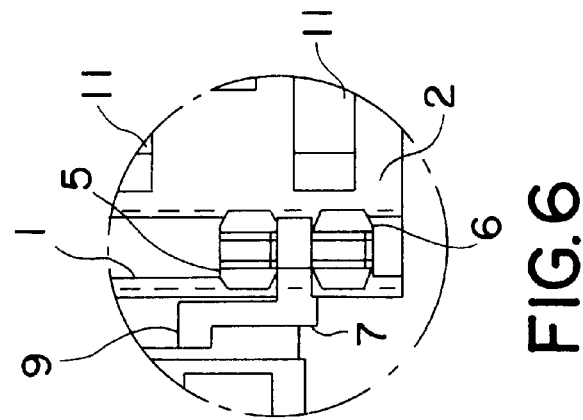
FIG. 6 is an enlarged detail view of position of FIG. 5 that is encircled by circle B.

The present invention is directed to adjustable target assemblies which can be incorporated into gripper devices that include slidable jaw members and used to determine or monitor or control the positioning of the gripper jaw tips or fingers. In alternative embodiments, the adjustable target assembly of the present invention can be used in combination with a variety of positioning devices, including tool holders for machining processes, article transfer devices, circuit and device testing probes, and similar devices which involve linear or near linear motion.

The adjustable target assemblies of the present invention include one or more target members and a pair of target set screws. The target members and target set screws are received in a threaded bore which is provided in a positioning device. The target members are used in conjunction with proximity sensors which are provided in or coupled to the positioning device. The adjustable target assemblies and corresponding proximity sensors are provided on portions or elements of the positioning device which move relative to one another. In this regard, the adjustable target assemblies of the present invention will be hereafter described with reference to a gripper device in which an adjustable target assembly is provided in a gripper jaw and corresponding proximity sensors are provided in the gripper jaw base or body. It is to be understood however that the adjustable target assemblies of the present invention are not limited for use with gripper jaw devices.

The target members of the present invention can be used in conjunction with various proximity sensors including mechanical switches, optical switches, electrical switches, magnetic switches, pneumatic switches, or the like. In this regard the target members can be made from magnetic materials or non-magnetic materials, light reflecting or light absorbing materials or coatings, electrically conductive or electrically non-conductive materials, and other suitable materials.

The target members include circular base portions which are received in the threaded bores. The target set screws can be tightened against the circular base portions of the target members in order to secure the target members in a desired location. Moreover, the target set screws can be positioned anywhere along the threaded bore, thus allowing the position of the target members to be adjustable.

A lead or inner target set screw and a follower or outer set screw is used in conjunction with each target member. In use, the lead or inner target set screw is inserted into the threaded bore and located at a position which corresponds to the desired position at which the target is to be secured. The target is next inserted into the threaded bore. The target is followed by the follower or outer set screw which is driven into the threaded bore until it presses the circular base portion of the target against the lead or inner target set screw. The follower or outer set screw is then tightened against the circular base portion of the target, thereby securing the target in its desired position.

The circular base portion of the target has a diameter which is smaller than the inner threaded surface of the threaded bore. Each of the inner and outer set screws have outer threads which engage and cooperate with the inner threaded surface of the threaded bore The lead or inner target set screw and the follower or outer target set screw are provided with keyed through-holes that have corresponding diameters which are equal to or smaller than the diameter of the bore in the circular base portion of the target member. These keyed through-holes are adapted to be engagable with a driving tool such as an allen wrench.

The position of the target member can be adjusted by first engaging a drive tool in the follower or outer target set screw and loosening the follower or outer target set screw. Next, the driving tool is positioned through the keyed through-hole of the follower or outer target set screw and through the through-hole in the circular base portion of the target member and in engagement with the keyed bore of the lead or inner target set screw. With the drive member thus engaging both the lead or inner target set screw and the follower or outer target set screw the drive member can be used to drive the moveable target assembly in a desired position along the threaded bore. Once in a desired position, the drive member is retracted so that it only engages the follower or outer target set screw. By tightening the follower or outer target set screw with respect to the lead or inner target set screw and target member, the position of the target member will be fixed.

Based upon the above manner of operation, it is to be understood that the lead or inner target set screw can include a recessed or stepped keyed bore rather than a keyed through-hole since it is not necessary to have the drive member pass through the lead or inner target set screw. It is also possible to provide the lead or inner set screw with a smaller keyed bore or through-hole than the keyed through-hole provided in the follower or outer target set screw, and use different drive members to move or reposition each of the target set screws. It is also possible to exclude through-holes in the set screws and circular base portion of the target member. However, excluding the through-holes would prevent simultaneous positioning of these elements.

The target members include target structures or elements which are sensed or detected by the proximity sensors. These target structures or elements extend from the circular base portions of the target members and can also extend outward from the threaded bore. It is possible to exclude such target structures when the circular base portion of the target members can be made from a material, e.g. a magnet material, which can be detected by suitable proximity sensors.

FIG. 1 depicts a perspective view of the gripper jaw which includes an adjustable target assembly according to the present invention. The gripper jaw 2 of FIG. 1 includes a threaded bore 1 which is provided in the bottom thereof. As depicted, a slot 3 that is parallel to the axis of the threaded bore 1 is provided in the lower surface 4 of the gripper jaw member 2. This slot 3 can be formed by having the threaded bore 1 intersect the lower surface 4 of the gripper jaw member 2. Alternatively, as depicted, a separate cutout can be provided which communicates between the threaded bore 1 and the lower surface 4 of the gripper jaw member 2

According to the present invention, the adjustable target assembly includes a lead or inner target set screw 5, a follower or outer target set screw 6, and a target member 7. As depicted, the target member 7 includes a to circular base portion 8 from which depends a target structure or element 9 As depicted in FIG. 1, the target structure or element 9 can either extend in a planer manner from the circular base portion 8 of the target member 7 or otherwise can be non-linear and extend at a distance which is axially spaced apart from the center of the circular base portion 8 of the target member 7. Target structures or elements 9 include a portion which will project downward or outward from slot 3 formed in the lower surface 4 of the jaw member 2. This extending portion of the target member 7, i.e. the target element 9, is designed to be sensed by an appropriate proximity sensor such as a mechanical switch, electrical sensor, optical sensor, or the like In use, the lead or inner target set screw 5 is driven into the threaded bore 1 at the bottom 4 of the jaw member 2 at a desired distance. Next, the circular base portion 8 of the appropriate target member 7 is positioned in the threaded bore 1. Next, the follower or outer set screw 6 is driven into the threaded bore 1 until the follower or outer target set screw 6 pushes the circular base portion B of the target member 7 against the lead or inner target set screw 5. Tightening the follower or outer target set screw 6 then will lock or secure the target member 7 in position.

According to one embodiment of the present invention, the follower or outer target set screw 6 can be provided with a through-hole which is sized to allow an appropriately dimensioned driving tool such as an allen wrench to pass therethrough, and through the bore in the circular base portion 8 of the target member 7, so as to be received by and engage the lead or inner target set screw 5. In this manner, a larger diameter driving tool configured to engage the follower or outer target set screw 6 can be used to loosen the follower or outer target set screw 6. Then, a smaller diameter driving tool can be used to position the lead or inner target set screw 5 at a desired location along the threaded bore 1. Next, the larger diameter driving tool can be used to lock the follower or outer target set screw 6 in position against the target member 7.

It is to be understood that an allen-type driving tool is merely used herein for illustrative purposes. The actual configuration of the keyed bore or keyed through-holes in the outer and/or inner target set screws can have shapes other than those which are complementary to allen wrenches.

FIG. 2 is similar to FIG. 1 in that it depicts a jaw member 2 having a threaded bore 1 on its lower surface 4. The target member 7 depicted in FIG. 2 is designed for sensing when the jaw member 2 is located in a closed position. In this regard, FIG. 2 depicts a target member 7 having a non-linear target structure 9 which extends slightly forward from its circular proportion 8 with respect to the jaw member 2.

FIG. 3 depicts a gripper jaw assembly having three gripper jaw members 2 on a single body or bass 10. This type of gripper structure can be used to grasp circular, spherical or cylindrical parts. Although reference has been made herein to the gripper jaw member 2, it is to be understood that appropriate jaw tips or fingers or other gripping structures are typically secured to the depicted gripping jaw members 2 by the threaded bores 11 provided in their upper surfaces. An example of such fingers are illustrated and discussed in U.S. Pat. No. 4,768,821.

FIG. 3 depicts a jaw open port 12 and a jaw closed port 13 to which fluid pressure lines can be attached and used to actuate or drive the jaw members 2 along their respective channels 14.

Figure 4:
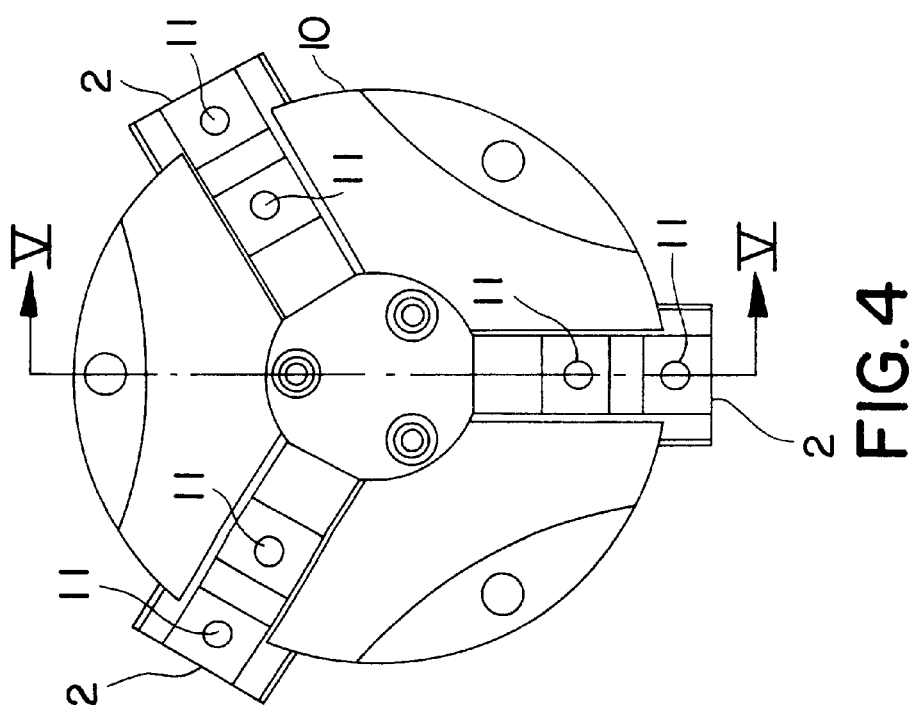
FIG. 4 is a top view of the gripper jaw assembly of FIG. 3.

FIG. 4 is a top view of the gripper jaw assembly of FIG. 3. FIG. 4 depicts the alignment of the jaw members 2 as they are positioned in an outward manner. Because the jaw members 2 are symmetrically aligned, they can be equipped with appropriate tips or fingers and used to grip an article with a circular cross section.

Figure 5:
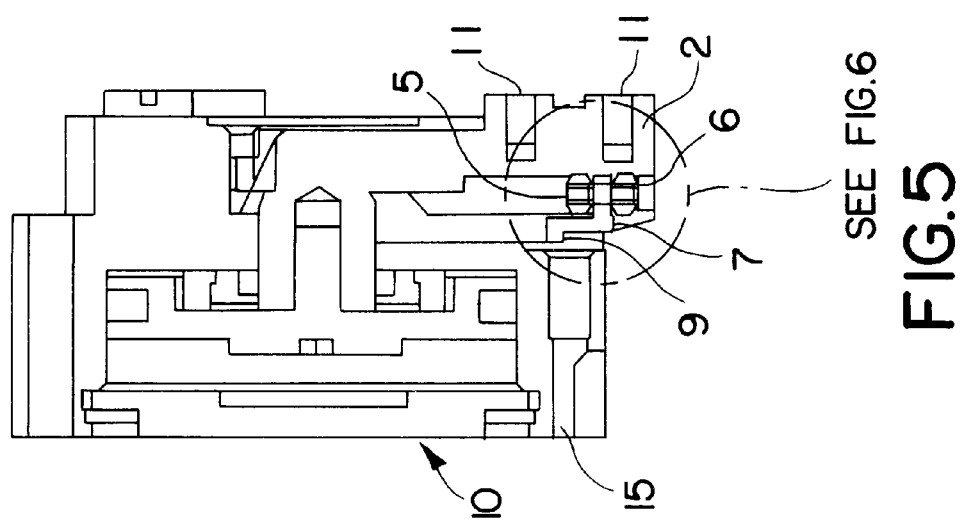
FIG. 5 is a cross-sectional view of the gripper jaw assembly of FIG. 4 taking a long plane V—V.

FIG. 5 is a cross-sectional view looking along plane V—V in FIG. 4. FIG. 5 depicts a moveable target assembly including the lead or inner target set screw 5, the target member 7 and the follower or outer target set screw 6 positioned within the threaded bore 1 of the jaw member 2. In this embodiment, a suitable proximity switch can be installed in the lower cutout 15 which is depicted as being aligned with the path of movement of the target structure 9.

FIG. 6 is an enlarged detail view of the adjustable target assembly elements as they are positioned with the threaded bore 1 in the bottom of the jaw member 2. FIG. 6 depicts an embodiment in which the lead or inner target set screw 5 and the follower or outer target set screw 6 are provided with keyed through-holes that have corresponding diameters which are equal. These keyed through-holes are adapted to be engagable with a driving tool such as an allen wrench. In this embodiment, the position of the target member 7 is adjusted by first engaging a drive tool in the follower or outer target set screw 6 and loosening the follower or outer target set screw 6. Next, the driving tool is positioned through the keyed through-hole of the follower or outer target set screw 6 and through the through-hole in the circular base portion 8 of the target member 7 and in engagement with the keyed bore of the lead or inner target set screw 5. With the drive member thus engaging both the lead or inner target set screw 5 and the follower or outer target set screw 6 the drive member can be used to drive the moveable target assembly in a desired position along the threaded bore 3 in the lower portion of the jaw member 2. Once in a desired position, the drive member is retracted so that it only engages the follower or outer target set screw 6. By tightening only the follower or outer target set screw 6 with respect to the lead or inner target set screw 5 and target member 7, the position of the target member 7 will be fixed.

It is to be understood that the present invention can be used with target members having various configurations at which the target structures are positioned with respect to the circular base portion of the target members. Also, the target members can be used in conjunction with various proximity sensors including mechanical switches, optical switches, electrical switches, magnetic switches or the like. It is also possible to include more than one target member in a single jaw member or a target member having more than one depending target structure. Such embodiments may be useful for gripper assemblies which include plural proximity sensors. To incorporate more than one target member in each gripper jaw would involve the inclusion of intermediate target set screws.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. An adjustable target assembly for use in positioning devices which comprises:

a body having an internally threaded bore therein;

a target member having a circular base portion with a through-hole therein, the circular base portion being positioned within the internally threaded bore; and first and second set screws positioned within the internally threaded bore on opposites sides of the circular base portion of the target member, at least one of the first and second set screws having a through-hole therein.

2. An adjustable target assembly according to claim 1, wherein both of the first and second set screws have through-holes therein.

3. An adjustable target assembly according to claim 2, wherein through-holes provided in the first and second set screws are configured to receive a driver tool therein.

4. An adjustable target assembly according to claim 1 wherein one of the first and second set screws has a through-hole therein and the other has a recess therein.

5. An adjustable target assembly according to claim 4, wherein the through-hole and recess in the first and second set screws are configured to receive a driver tool therein.

6. An adjustable target assembly according to claim 1, wherein through-holes provided in the first and second set screws are configured to receive a driver tool therein.

7. An adjustable target assembly according to claim 1, wherein the target member includes a target element which extends from the circular base portion.

8. An adjustable target assembly according to claim 7, wherein the target element extends through a slot provided in a side of the threaded bore.

9. An adjustable target assembly according to claim 7, wherein the target element is straight.

10. An adjustable target assembly according to claim 7, wherein the target element is non-linear.

11. A method of adjusting proximity sensors in a positioning device, which proximity sensors include a target member, the method comprising:
providing an internally threaded bore in a portion of the positioning device;
providing a target member having a circular base portion;
providing first and second set screws;
inserting the first set screw into the internally threaded bore and adjusting the position of the first set screw within the internally threaded bore;
inserting the circular base portion of the target member in the internally threaded bore; and
inserting the second set screw into the internally threaded bore and driving the second set screw against the circular base portion of the target member so that the target member is secured in position between the first and second set screws.

12. A method of adjusting proximity sensors in a positioning device according to claim 11, further comprising;
providing the circular base portion of the target member with a through-hole;
providing the second set screw and the circular base portion of the target member with through-holes;
inserting a driving tool through the through-hole in the second set screw and through the through-hole in the circular base portion of the target member;
and adjusting the position of the first set screw with the driving tool.

13. A method of adjusting proximity sensors in a positioning device according to claim 12, further comprising:
manipulating the driving tool to simultaneously adjust the positions of the first and second set screws.

14. A method of adjusting proximity sensors in a positioning device according to claim 11, further comprising:
providing the target member with a target element which extends from the circular base portion.

15. A method of adjusting proximity sensors in a positioning device according to claim 14 further comprising:
extending the target element through a slot provided in a side of the threaded bore.

16. A method of adjusting proximity sensors in a positioning device according to claim 11, wherein the positioning device comprises jaws of a gripper.

17. A method of adjusting proximity sensors in a positioning device according to claim 11, wherein the proximity sensors include at least one of mechanical switches, optical switches, electrical switches, pneumatic switches or magnetic switches.

18. A gripper device which comprises:
a base;
at least one gripper jaw which is movable relative to the base;
an internally threaded bore in one of the base or the at least one gripper jaw;
a target sensor coupled to the other of the base or the at least one gripper jaw; and
an adjustably target assembly provided in the internally threaded bore, the adjustable target assembly comprising:
a target member having a circular base portion, the circular base portion being positioned within the internally threaded bore; and
first and second set screws positioned within the internally threaded bore on opposites sides of the circular base portion of the target member.

19. A gripper device according to claim 18, wherein internally threaded bore includes a slot along one side thereof and the target member includes a target element which extends from the circular base portion through the slot.

20. A gripper device according to claim 18 wherein the circular base portion and at least one of the set screws have through-holes therein.

21. A gripper device according to claim 20, wherein the through-holes are configured to receive and engage a driving tool.

* * * * *